Feb. 25, 1958     P. G. FRAZIER     2,824,415
SELF-PROPELLING ROTARY MOWER
Filed April 23, 1956     2 Sheets-Sheet 1
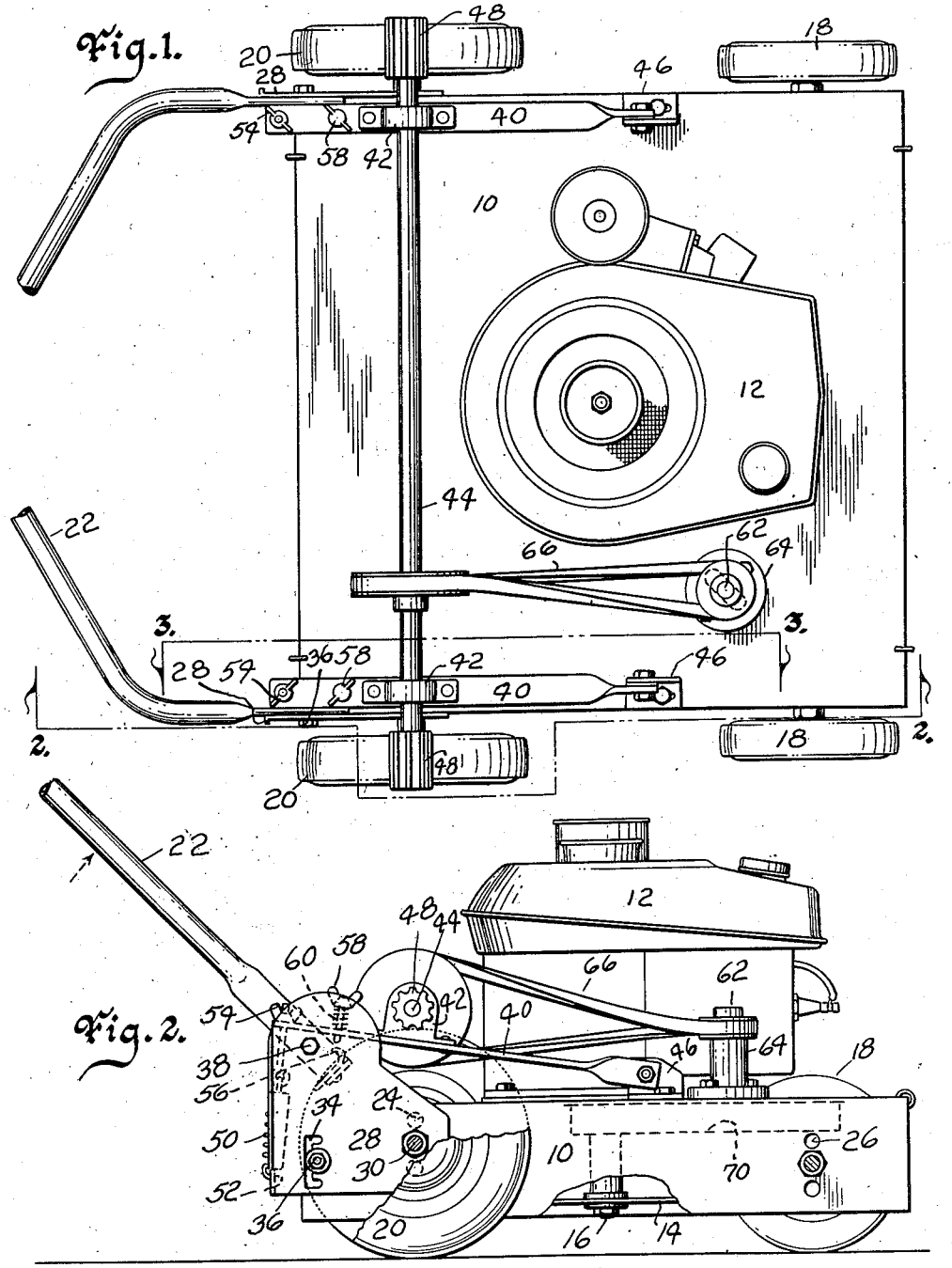
Witness
Edward P. Seeley
Inventor: Pearl G. Frazier
by Lendrum A. MacEachron
Attorney Feb. 25, 1958　　　P. G. FRAZIER　　　2,824,415
SELF-PROPELLING ROTARY MOWER
Filed April 23, 1956　　　2 Sheets-Sheet 2
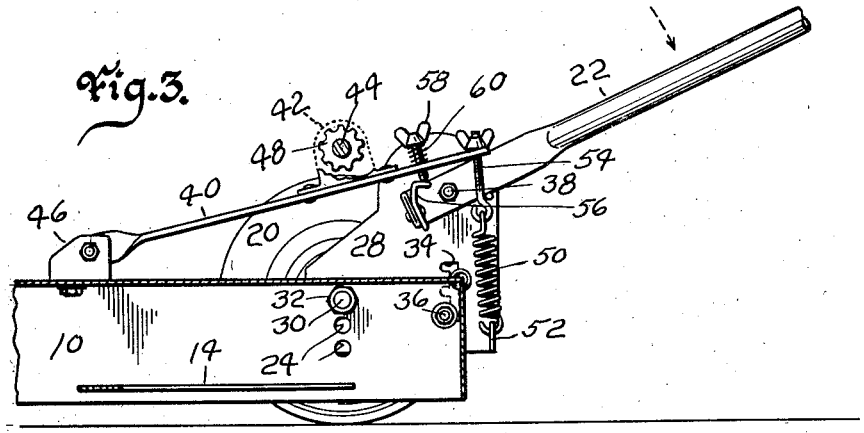
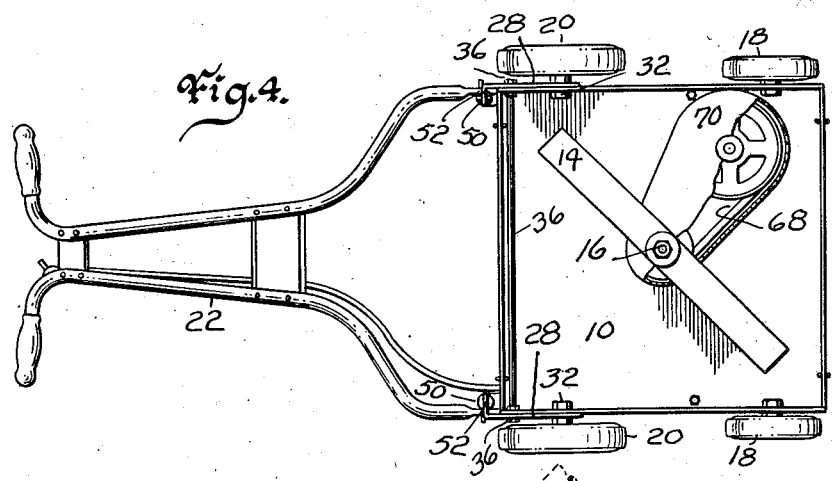
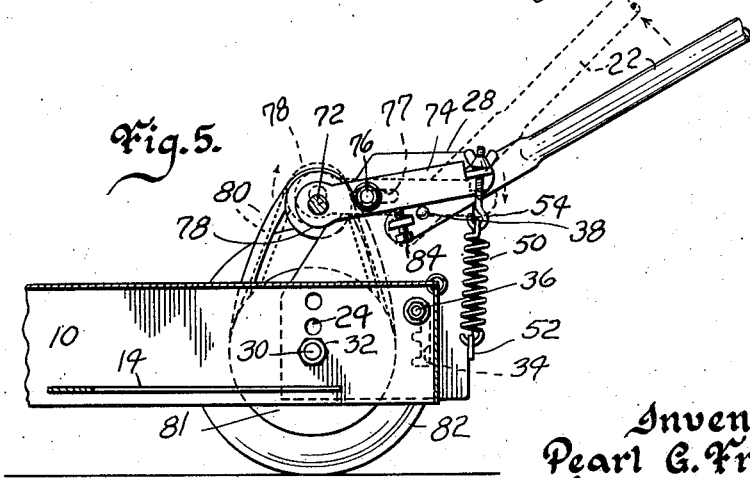
Inventor
Pearl G. Frazier
by Lendrum A. MacEachron
Attorney
Witness
Edward C. Seeley

United States Patent Office 2,824,415
Patented Feb. 25, 1958

2,824,415

SELF-PROPELLING ROTARY MOWER

Pearl G. Frazier, Des Moines, Iowa

Application April 23, 1956, Serial No. 579,938

5 Claims. (Cl. 56—25.4)

This invention is a self-propelling structure for rotary type lawn mowers. It features extremely simple design which is achieved in part at least through the use of end plates whose relationship to the wheels that are driven and the driving mechanism is predetermined and fixed. Adjustment of the cutting height of the machine is readily made, therefore, by moving the wheels relative to the frame without destroying the adjustment of the driving mechanism in relation to the wheels that are powered. A second feature of the device is a very simple method of engaging and disengaging the power source to and from the wheels. A third featured structure is the use of a vertical jackshaft extending both above and below the frame of the mover to serve as the connecting link between the engine and balance of the driving mechanism. All of the featured structure is also inexpensive as a result of its simplicity.

Accordingly it is the main object of this invention to provide a novel self-propelling structure for rotary type lawn mowers; one that:

(1) Permits changes in the cutting height of the mower without destroying the adjustment of the driving mechanism.

(2) Provides for very flexible operating qualities of the machine.

(3) Is inexpensive to construct and maintain.

While the foregoing specifically listed objects are the principal ones of this invention it is my intention to include as objects hereof any others such as are clear to a skilled lawn mower mechanic after he has read this specification and examined the accompanying drawings that are briefly described as follows:

Fig. 1 is a plan view of a rotary lawn mower equipped with my self-propelling structure, Fig. 2 is a side elevation of the mower partially in section on the line 2—2 of Fig. 1 with portions of the device broken away and hidden portions shown in broken lines: a dotted line shows the outline of the rear wheel that is shown only in fragment with solid lines, Fig. 3 is a fragmentary, longitudinal section of the mower taken on the line 3—3 of Fig. 1, with dotted lines showing the outline of an element in the foreground that is broken away, Fig. 4 is a reduced bottom view of the mower with a portion of the bottom belt guard broken away, and Fig. 5 is a view similar to that of Fig. 3 but showing a modified structure in which dotted lines show an adjusted position of parts and broken lines illustrate hidden parts.

Referring to the drawings in which the parts are designated with numerals that remain consistant throughout the drawings, the invention is seen to consist of a conventional rotary lawn mower with novel means for connecting the engine to the wheels. The mower has a frame 10, the usual engine 12 and cutting blade 14 secured to the shaft 16 of the engine 12. The mower also has the usual small front wheels 18 and the rear wheels 20. A conventional type guiding handle 22 is modified somewhat to serve also as the means for controlling the self-propelling structure of the mower, as will be explained below. In my experience, the usual manner of adjusting the cutting height of the blade 14 in this type of mower is by moving the wheels up or down on the frame 10 and thus raise or lower the blade 14 relative to the ground. As shown in Figures 2, 3 and 5, the holes 24 are provided for the rear wheels 20 and as seen in Fig. 2, the holes 26 are provided for the front wheels. Fig. 2 illustrates an intermediate height adjustment of the cutting blade while Figures 3 and 5 show low and high adjustments respectively. This simple method of adjusting the wheels on the mower to give different cutting heights has been one of the problems in attempting to make a simple self-propelling structure for these mowers. As the wheels are moved the drive mechanism of the mower, which is necessarily operatively associated with the wheels of the device, tends to be thrown out of adjustment if the mechanism for driving is secured to the frame of the mower in a conventional manner. My end plates 28 serve to maintain the adjustment between the wheels and the self-propelling structure when cutting height adjustments are made. These plates provide a predetermined and fixed relationship between the wheels and the portion of the driving mechanism that engages the wheels.

A fixed predetermined relationship between the wheels 20 and the end plates 28 is maintained by having a single hole in the end plates through which the axles 30 of the wheels 20 pass and are secured by the usual nuts 32. As the axles are shown in the holes in plates 28 in all of the drawings, the holes themselves cannot be and are not numbered separately. Stability is afforded the plate by having another portion of the plate preferably in the form of an E-slot 34 engage a fixed member 36 of the frame 10. Obviously the particular structure shown does not exhaust the possibilities for stabilizing the end plates, and it is preferred because the element 36 is a brace rod that is normally present in the mower and the E-slot permits adjustment of the plates without removal of the nut from the brace rod. To adjust the wheels 20 in changing the cutting height for which the mower is set, it is necessary to remove the wheel axle nuts 32 and withdraw the axles 30. The nut of element 36 is then loosened until the plate can be slidably moved relative to the frame 10. Plate 28 is then moved toward the wheels 18 until the element 36 is in the vertical portion of E-slot 34. Plate 28 can then be moved either up or down until the desired location is reached and then moved back until one of the legs of the E-slot 34 is again engaged by the brace rod 36. When the plate is level, the hole in the plate for the wheels axles 30 will be aligned with one of the holes 24 so that the axle can be reinstalled and secured with nuts 32. Now it will be observed, by comparing Figures 2, 3 and 5, that while the wheels have changed position with relation to the frame 10 of the mower as the axle is moved from hole to hole, the wheel and the end plate remain in exactly the same position in relation to each other as they were before they were moved. Any structure which is supported by or otherwise has its position stabilized relative to the end plates 28 will also maintain a fixed position relative to the wheels 20.

Handle 22, for example, is seen to be pivotally secured to the end plates 28 in any suitable manner as by the nut and bolt assemblies 38. A pair of arms 40 support the bearings 42 through which the horizontal jackshaft 44 is journalled. The arms are secured to the frame 10 moveably by suitable means such as the brackets 46. The horizontal jackshaft is provided with some means for operatively associating it with the wheels 20 such as the friction drive elements 48. Whenever these friction drive elements are in contact with the wheels 20, the horizontal jackshaft 44 and the wheels 20 are secured together for simultaneous rotation. This connection between the wheels and the horizontal jack shaft is constantly urged by the springs 50 that are secured to the plates 28 by hooking through pierced ears 52 and to the arms 40 by threaded hooks and butterfly nut or wing nut assemblies 54. This is the situation that is illustrated in Fig. 2. Fig. 3, on the other hand shows that when the handle 22 is lowered, portions 56 engage a portion of the arms 40 to raise the arms sufficiently to cause the friction elements 48 to disengage the wheels 20 thus leaving the wheels and the friction elements free to turn independently of each other. Thus springs 50 urge the driving elements on the horizontal jackshaft into proper juxtaposition for driving while pivoting the handle 22 down separates these portions of the driving mechanism to render it ineffectual. Portions 56 of handle 22 preferably engage an adjustable stop 58 of the arm 40 which may be a threaded wing screw with a suitable means such as spring 60 for retaining any adjustment made. This adjustable stop controls how far down handle 22 must be pivoted to disengage the driving mechanism from the wheels. Handle 22 and springs 50 that determine the force with which the wheels and friction elements are brought together are seen, therefore, to constitute collectively the control mechanism of the self-propelling structure of the mower. As these parts are all moved together when the plates 28 are moved in changing the cutting height of the mower blade 14, they retain their adjustment relative to each other to preserve a previously achieved proper adjustment. Since pivoting the handle down disengages the self-propelling mechanism, accidental dropping of the handle 22 will cause the mower to stop moving.

Power from engine 12 is supplied to the horizontal jackshaft 44 through the vertical jackshaft 62. The vertical jackshaft extends both above and below the frame 10 and is secured to the frame by suitable means such as the bearing post 64. A belt and pulley system 66 connects the vertical jackshaft to the horizontal jackshaft, and as shown in Fig. 4, a similar belt and pulley system 86 associates the vertical jackshaft and the engine crankshaft below the frame 10 and above the cutting blade 14. An appropriate shield such as the one 70 protects the lower belt from being fouled by materials being cut. This vertical jackshaft structure is an important part of my novel self-propelling structure. It provides an inexpensive means of obtaining the necessary speed reduction between the engine and the wheels and also provides a simple means of transferring power from the engine to the horizontal jackshaft. Throughout the system of belts and pulleys provision is made for tightening the belts by moving the pulleys farther apart by conventional means.

In Fig. 5 which shows a form of the invention employing belts and pulleys between the wheels and the horizontal jackshaft instead of the friction drive illustrated in the other figures, the various parts that are the same as parts in the more fully illustrated form of the invention are designated by the same numbers. For example, frame 10, handle 22, wheel adjustment holes 24, axle 30, axle nut 32, E-slot 34, handle pivot 38, frame portion 36, spring 50, ear 52, threaded hooks and butterfly nut assembly 54 are all the same in both forms of the invention. As the end plate in the form of the invention shown in Fig. 5 serves the same general function in practically the same manner in both forms of the invention, it is also designated by the same number in both forms, namely 28. In Fig. 5 the horizontal jackshaft 72 is rotatably supported by the short arms 74 that are pivotally supported at 76 on the plate 28. A slot 77 in the plate 28 permits moving the arm 74 toward the rear of the mower to tighten the belt (not shown by the same as the one in system 66) that connects the horizontal jackshaft to the power system. The jackshaft 72 carries a pulley 78 which is connected by means of a conventional belt 80 to a pulley 81 fixed on the wheel 82. An adjustable stop means 84 secured to handle 22 engages the arm 74 when the handle is down as shown in solid lines to lift the rear end of the arm 74 and relieve tension on the belt 82. In this position of the handle the propelling mechanism is disengaged as in the more fully illustrated form. Dotted lines show how the spring 50 pulls the rear end of the arm 74 down and moves the pulley 78 up to tighten the belt 80 when the handle is raised. The modified form of the device operates in essentially the same manner as the more fully illustrated one, therefore.

I have disclosed my invention by describing it and showing with drawings practical embodiments thereof, and I now particularly point out and distinctly claim those structures and combination of structures that I believe to be my invention.

I claim:

1. In a self-propelling rotary type lawn mower having a propelling drive control; a pair of vertically moveable plates secured to said mower; portions of said drive control being supported by said plates; and means associated with two wheels of said self-propelling rotary type lawn mower and said plates for maintaining a predetermined relationship between them.

2. The self-propelling, rotary type lawn mower of claim 1 in which said means for maintaining a predetermined relationship between said plates and said wheels is a hole in each of said plates through which a wheel axle extends and an element on each of said plates spaced from the wheel axle holes and adapted to engage a fixed portion of said mower.

3. In a self-propelling, rotary type lawn mower having a frame, wheels, cutting blade, a vertical crankshaft engine, and a propelling drive control; the vertical crankshaft of said engine extending below said frame; a vertical jackshaft secured to said frame and extending above and below said frame; a pulley on the vertical crankshaft of said engine below said frame and above said cutting blade; a pulley on said vertical jackshaft below said frame and aligned with said pulley on the vertical crankshaft of said engine; a belt reeved around said pulleys; a pair of vertically moveable plates secured to said frame; portions of said propelling drive control secured to and supported by said plates; means associated with two of said wheels and said plates for maintaining a predetermined mounted relationship between them; and means above said frame for operatively associating and disassociating said vertical jackshaft with said wheels under the control of said drive control.

4. The self-propelling, rotary type lawn mower of claim 3 in which said means above said frame for operatively associated and disassociating said vertical jackshaft with said wheels is a belt and pulley assembly.

5. In a self-propelling, rotary type mower having a frame, wheels, cutting blade, and a vertical crankshaft engine mounted thereon; said cutting blade being secured to the vertical crankshaft of said engine below said frame; a vertical jackshaft secured to said frame and extending above and below said frame; a pulley on said vertical crankshaft of said engine below said frame and above said cutting blade; a pulley on said vertical jackshaft below said frame and aligned with said pulley on said engine vertical crankshaft; and a belt reeved around said pulleys; said vertical jackshaft being adapted above said frame to be operatively associated with the driving structure of said rotary type mower.

References Cited in the file of this patent

UNITED STATES PATENTS

| | | |
|---|---|---|
| 2,468,839 | Rodesci | May 3, 1949 |
| 2,708,484 | Hoffman | Mar. 17, 1955 |
| 2,736,389 | Phelps | Feb. 28, 1956 |